United States Patent
Kappel et al.

(10) Patent No.: US 11,520,096 B2
(45) Date of Patent: Dec. 6, 2022

(54) SIDE-EMITTING LIGHT GUIDE AND METHOD FOR THE PRODUCTION THEREOF

(71) Applicant: SCHOTT AG, Mainz (DE)

(72) Inventors: Markus Kappel, Roxheim (DE); Bernd Hoppe, Ingelheim (DE); Hubertus Russert, Jugenheim (DE); Lothar Willmes, Oestrich-Winkel (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/013,263

(22) Filed: Sep. 4, 2020

(65) Prior Publication Data
US 2021/0063625 A1   Mar. 4, 2021

(30) Foreign Application Priority Data

Sep. 4, 2019   (DE) .............. 10 2019 123 693.2

(51) Int. Cl.
*G02B 1/04* (2006.01)
*F21V 8/00* (2006.01)

(52) U.S. Cl.
CPC .............. *G02B 6/001* (2013.01); *G02B 1/046* (2013.01); *G02B 1/048* (2013.01); *G02B 6/0001* (2013.01)

(58) Field of Classification Search
CPC ........ G02B 6/001; G02B 1/046; G02B 1/048; G02B 6/0001
See application file for complete search history.

(56) References Cited

U.S. PATENT DOCUMENTS 4,763,984 A * 8/1988 Awai .................. G02B 6/001
                                                    385/31
5,333,234 A * 7/1994 Hashimoto .......... C03C 25/105
                                                    385/145

(Continued)

FOREIGN PATENT DOCUMENTS

DE   102008009139   8/2009
DE   102009039556   3/2010

(Continued)

OTHER PUBLICATIONS

ISO 11135, "Sterilization of health-care products—Ethylene oxide—Requirements for the development, validation and routine control of a sterilization process for medical devices", Jul. 15, 2014, 88 pages.

(Continued)

*Primary Examiner* — Fatima N Farokhrooz
(74) *Attorney, Agent, or Firm* — Ruggiero McAllister & McMahon LLC

(57) ABSTRACT

A light source with a linear appearance is provided. The light source has a flexible light guide that has a homogeneous light emission with high luminance and a emitting light guide. The light emitting guide has a core, in which at least one soul extends, and a transparent cladding that surrounds the core. The core and the cladding are formed from transparent plastic. The core has a higher index of refraction than the cladding. The soul is light-deflecting, light-reflecting, or light-scattering so as to scatter light guided in the light guide and to emit the light through the cladding toward the outside. The soul has a scattering length that is at most twice as large as a maximum cross-sectional dimension of the soul.

22 Claims, 4 Drawing Sheets

(56) References Cited

U.S. PATENT DOCUMENTS

| | | | |
|---|---|---|---|
| 5,485,541 A | 1/1996 | Bigley | |
| 5,684,904 A | 11/1997 | Bringuier | |
| 5,695,583 A | 12/1997 | van den Bergh | |
| RE36,157 E | 3/1999 | Robbins | |
| 6,169,836 B1 | 1/2001 | Sugiyama | |
| 6,519,401 B1 | 2/2003 | Imamura | |
| 2003/0185530 A1* | 10/2003 | White | B29C 70/585 385/124 |
| 2005/0213907 A1* | 9/2005 | Hiroishi | G02B 6/0281 385/123 |
| 2007/0189031 A1 | 8/2007 | Delmar | |
| 2008/0025039 A1 | 1/2008 | Guillermo | |
| 2008/0061457 A1* | 3/2008 | Walker | B29C 48/05 264/1.24 |
| 2011/0002589 A1 | 1/2011 | Ho | |
| 2011/0103757 A1* | 5/2011 | Alkemper | C03B 37/01211 385/124 |
| 2012/0170305 A1* | 7/2012 | Rudek | G02B 6/001 362/581 |
| 2013/0195410 A1* | 8/2013 | Karbasivalashani | G02B 6/02338 385/124 |
| 2013/0314940 A1* | 11/2013 | Russert | C03B 37/01222 362/556 |
| 2014/0218958 A1 | 8/2014 | Fewkes | |
| 2015/0049994 A1 | 2/2015 | Schultheis | |
| 2015/0131955 A1 | 5/2015 | Bennett | |
| 2016/0038621 A1* | 2/2016 | Victor | A61L 2/10 128/202.16 |
| 2016/0101263 A1* | 4/2016 | Blumenkranz | A61B 5/6852 600/117 |
| 2016/0313486 A1 | 10/2016 | Woelfing | |
| 2016/0320556 A1* | 11/2016 | Nasilowski | G02B 6/02366 |
| 2016/0341612 A1* | 11/2016 | Bals | G01L 1/246 |
| 2017/0184772 A1 | 6/2017 | Dykaar | |
| 2017/0312117 A1 | 11/2017 | Shah | |
| 2018/0120267 A1* | 5/2018 | Wang | G01N 29/34 |
| 2018/0369432 A1 | 12/2018 | Zaborsky | |
| 2020/0222712 A1 | 7/2020 | Schultheis | |

FOREIGN PATENT DOCUMENTS

| | | |
|---|---|---|
| DE | 102012208810 | 11/2013 |
| DE | 202017107616 | 1/2018 |
| DE | 102017122 | 4/2019 |
| DE | 102017129978 | 6/2019 |
| EP | 3086027 | 10/2016 |
| EP | 3096077 | 11/2016 |
| JP | H05341125 | 12/1993 |
| JP | H0675118 | 3/1994 |
| JP | H06331830 | 12/1994 |

OTHER PUBLICATIONS

ISO 10993-1, "Biological evaluation of medical devices—Part 1: Evaluation and testing within a risk management process", Fifth Edition, Aug. 2018, 48 pages.

* cited by examiner

SIDE-EMITTING LIGHT GUIDE AND METHOD FOR THE PRODUCTION THEREOF

CROSS REFERENCE TO RELATED APPLICATIONS

This application claims benefit under 35 USC 119 of German application 10 2019 123 693.2 filed Sep. 4, 2019, the entire contents of which are incorporated herein by reference.

BACKGROUND

1. Field of the Invention

The invention relates to the technical field of light-emitting elements in general. In particular, the invention relates to the use of light guides in lighting devices or display devices.

2. Description of Related Art

For lighting or display purposes, it may be desirable to utilize linear light sources. A light emitter having a side-emitting light guide coupled to it can serve as such a light source. In terms of a space-saving construction and also a high robustness, among other things, such an arrangement is superior to an arrangement composed of many small, adjacently arranged emitters, such as, for instance, an LED chain. Thus, in the case of such a chain, the large number of components can rapidly result in the failure of individual light diodes, which is perceived immediately as disturbing to the eye.

Side-emitting light guides offer another possibility for the creation of linear light sources. In these light guides, light emitters are connected at one end or at both ends and couple light into the light guide. Distributed in the light guide are scattering elements, which disperse the light that is guided in the light guide. These light sources create a very homogeneous illumination. However, the total luminous flux is limited by the intensity provided by the light emitter.

Even when the light guide shines homogeneously to the eye, there exists a problem in the case of a nonlinear course of the light guide. If a light guide made of glass is used, it is generally not sufficiently flexible when it has an adequate thickness. Although light guides made of plastic are known, the known solutions have only a small luminance, however. In addition, a problem can arise during bending of the light guide. If the light guide is bent when it is fastened by clips on a subsurface, for example, the scattering cladding layer can detach or is stretched and thereby becomes thinner due to the bending in the outer region and is compressed in the interior of the bend, so that wrinkles can form. In the process, air gaps can form between the scattering cladding and the light-guiding core and can also remain there during realignment. These air gaps then lead to a locally varying decoupling of the light and thereby to an inhomogeneous luminous intensity.

SUMMARY

The invention is consequently based on the object of providing a light source with a linear appearance, which has a flexible light guide that has a homogeneous light emission with high luminance.

Accordingly, the invention provides a side-emitting light guide that comprises a core, in which an interior element ("soul") extends, as well as a transparent cladding that surrounds the core, wherein the core and the cladding are formed from transparent plastic, wherein the core has a higher index of refraction than the cladding, and wherein the soul is designed to be light-deflecting, in particular, light-reflecting and/or light-scattering in order to scatter the light that is guided in the light guide and to emit it through the cladding toward the outside.

In this case, the scattering length of the soul is preferably at most twice as large as and, especially preferred, at most as large as the maximum cross-sectional dimension of the interior element. In the preferred case of a soul with a round cross section, the maximum cross-sectional dimension is given by the diameter of the soul. In the case of an oval soul, the maximum cross-sectional dimension would be, as another example, the extension along the major axis of the elliptical cross section. The scattering length is defined as the length for which, owing to scattering, the original intensity of the light in the incident direction has declined by a factor of 1/e. For the scattering length ls and the luminous intensity $I(x)$ along a path distance in the x direction in the material of the soul and for negligible absorption, the following relation applies: $I(x)=I_0 \cdot \exp\{x/ls\}$, where $I_0$ is the original luminous intensity when the light impinges on the soul. In the case of a material designed with a negligible absorption, this therefore represents a limiting value; in the case of non-negligible absorption of the material, the scattering length is determined to be shorter than according to the preceding equation. Absorption is non-negligible particularly for metal materials, which particularly absorb strongly in the range of visible light from 380 nm to 780 nm. For this, the scattering length can be approximately determined as in the preceding for materials with negligible absorption, with the stipulation that the value determined in this way is too large and therefore, the actual scattering length will be shorter. Owing to the fact that the scattering length is especially preferred at most as large as the cross-sectional dimension of the soul, the soul appears to be essentially non-transparent when the light guide is viewed from the side, that is, essentially opaque in the visible spectral region. For the light that is guided in the core, this means, on the other hand, that light that impinges on the soul is scattered with high probability and with high intensity and subsequently exits the light guide. The soul thereby appears during operation as a brightly shining linear element.

The soul is preferably markedly thinner than the light guide in order to achieve a high luminance. In particular, in a preferred embodiment, it is provided that the soul has a cross-sectional area, measured in the direction perpendicular to the longitudinal direction of the light guide, that is smaller by at least a factor of 4, preferably by at least a factor of 20, than the cross-sectional area of at least 0.7 mm² enclosed by the outer contour of the transparent cladding. However, for a soul that is too thin in relation to the thickness of the light guide, the absolute brightness, in turn, declines. Therefore, in accordance with yet another further development, it is favorable when the soul has a cross-sectional area, measured in the direction perpendicular to the longitudinal direction of the light guide, that is smaller by at most a factor of 2500 than the cross-sectional area of the core.

In contrast to known side-emitting plastic light guides, the light-scattering structures are accordingly arranged in a concentrated manner inside the light-guiding core and preferably form an at least partial or sectionally discrete region. Because the light-scattering structures are the parts of the light guide that appear to shine and from which light is emitted toward the outside, the light guide has, in accordance with this disclosure, a very small emission surface and thus a very high luminance. Also the problem that, during bending, detachment can occur between the plastic layers of a plastic light guide, thereby resulting in a local change in the light emission, is circumvented for the light guide described here, in that the light emission from a soul originates in the interior of the core, which is near to or on the neutral fibers. The light-scattering structures are thus hardly influenced or not at all influenced by a bending of the light, even when there is a change in the structure of the plastics or geometric and/or mechanical changes occur during bending.

In an especially advantageous way, the light guide can be produced simply by coextrusion. In this case, the coextrusion can occur around an already existing soul. The light-scattering element of the soul can also be added to the plastic of the core during coextrusion or else an additional plastic with light-scattering elements, in particular particles, is used for the soul and is coextruded together with the plastics of the core and cladding. As light-scattering elements, besides particles, also filaments and, above all, also bubbles come into consideration. The geometry of such particles, filaments, or bubbles can be, in particular, also non-round and irregular and/or can have different extensions of the spatial main axes.

BRIEF DESCRIPTION OF THE DRAWINGS

The invention will be described in detail below on the basis of figures.

DETAILED DESCRIPTION

Figure 1:
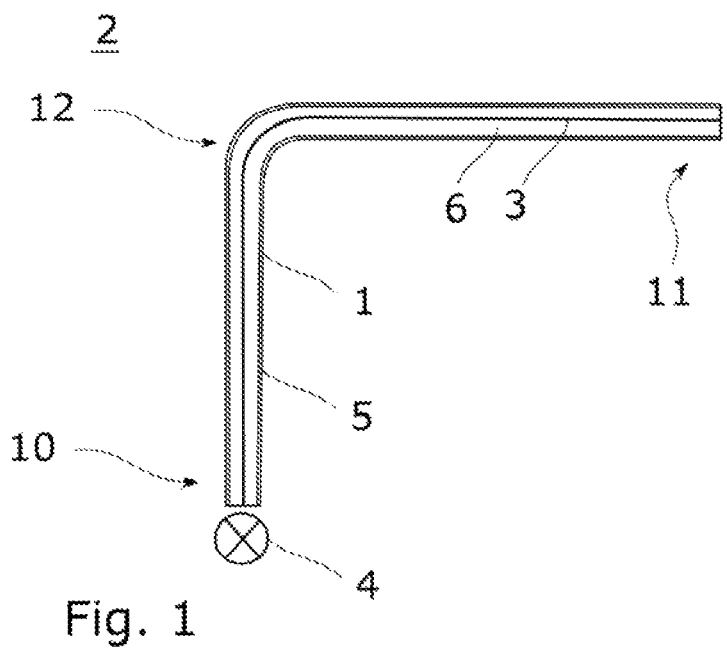
FIG. 1 shows a light source with a side-emitting light guide.

In FIG. 1, a light source 2 with a light guide 1 in accordance with this disclosure is schematically illustrated. The light source 2 comprises a light emitter 4, which, at one end 10 of the light guide 1, is optically coupled to the core 6 in order to couple light into the light guide 1. In general, without any limitation to the exemplary embodiment illustrated, semiconductor light emitters are preferred for the light source 2, whereby, depending on the field of application, it is also possible, in particular, for lasers of other design constructions, such as, for example, gas lasers, solid-state lasers, excimer lasers, or fiber lasers to find application. They can comprise light-emitting diodes or semiconductor lasers. In this way, it is also possible for a plurality of light emitters of different colors to be coupled in order to obtain an illumination with an adjustable light color. In contrast to what is illustrated in FIG. 1, it is also possible for light emitters 4 to be arranged at both ends 10, 11 of the light guide 1 in order to couple their light into the fibers 7. As illustrated, the soul 3 extends inside of the core 6, which, in turn, is surrounded by the transparent cladding 5.

Because both the core 6 and the cladding 5 are made of plastic, the light guide 1 has a high flexibility, so that it can be put in place and fixed in position with a bend 12 in a simple way. In the illustrated example, the light guide 1 is provided, by way of example, with a bend 12 that deflects the light by 90°. In general, without any limitation to the schematic example, it is provided in one embodiment that the light source 2 comprises a light guide 1 that extends with a bend, whereby the bending radius corresponds to at least ten times the diameter of the light guide. Up to this value, light losses and changes in the light guide due to the bending are generally not noticeable.

Figure 2:
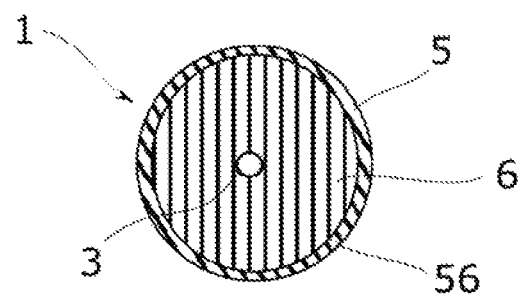
FIG. 2 and FIG. 3 show cross-sectional views of a light guide.

FIG. 2 shows a cross-sectional view through one embodiment of a light guide 1. As illustrated, the soul 3 extends in the interior of the core 6. Without any limitation to the special exemplary embodiment, it is preferred when the soul 3 extends in the middle in the core 6. In contrast to what is illustrated, it is also possible for two or more souls 3 to extend in a core 6. Owing to the fact that the core 6 has a higher index of refraction than the cladding 5, the light that is guided in the core 6 is totally reflected at the interface 56 between core 6 and cladding 5. Without any limitation to the illustrated embodiment, many alternatives are possible for the light-scattering soul 3. In this case, it is also conceivable that the soul 3 is not made of a plastic. Thus, in accordance with one embodiment, it is provided that the soul 3 comprises a cord or a wire.

The cord may also be referred to as a braid or thread. The cord or the wire or the thread here can be fabricated from plastic, glass, or else another material, such as, for example, metal or natural fibers, and can comprise at least one braid or fiber. Also in this case, in particularly preferred embodiments, a coextrusion is possible, and can be provided particularly in that during the coextrusion, the light-scattering elements of the soul will be added to the plastic of the core during the coextrusion, or an additional plastic containing light-scattering elements, particularly particles, will be used for the soul, and this will be coextruded together with the plastics of core and cladding and is designed in the form of a wire or cord or thread, thus thread-form, line-form, or fiber-form, along the longitudinal axis of the light guide 1. Conceivable in the case of glass as the material of a soul 3 are, for example, so-called white or milk glasses or other, in particular, translucent or opaque colored glasses. In the case of a plurality of braids or fibers, they can be arranged loosely adjacently to one another or else joined to one another or twisted, braided, or woven together. Accordingly, the soul 3 can be essentially smooth in design or, for example, depending on its construction, rough or structured or partially or sectionally of a single color or multicolored in design. The structuring of the surface of the soul offers, in addition, the possibility of being able to adjust the scattering behavior and the scattering length in a large range of more than 50% of the total scattering.

The embodiment with a soul 3 in the form of a wire or cord can be especially advantageous, because, at the same time, this soul affords the light guide 1 a high stability and tensile strength. The soul can also be an electrical conductor or at least contain or comprise an electrical conductor. This embodiment is especially advantageous, because, in this case, the property as light emitting element is combined with the possibility of transporting electrical signals and/or electrical energy. Thus, for example, a light emitter that couples light into the core 6 with the electrical conductor could be provided. Accordingly, this also offers the possibility of integrating in sections a plurality of light emitters in the light guide in order to create a homogeneous illumination appearance of the light guide even over larger path distances of several hundred meters or, by means of light emitters of different wavelengths, also to be able to achieve colored effects and specific effect regions in the light guide. In another embodiment, the soul and/or the core and/or the cladding can have a generally non-round or polygonal geometry in order to make possible a directed or structured light emission or to enable fastening to surrounding structural components.

Figure 3:
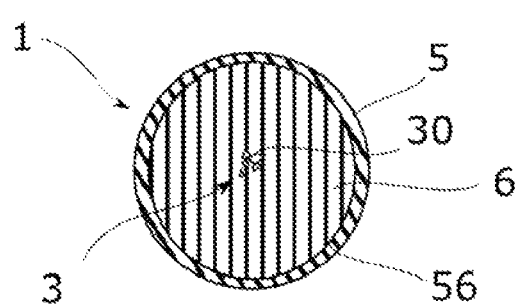

In accordance with another embodiment, the soul 3 comprises light-scattering particles. An example of such an embodiment with particles 30 is shown in FIG. 3. The particles 30 can be added to the plastic of the core 6 during a coextrusion of the plastics of core 6 and cladding 5. In accordance with yet another embodiment, a plastic with particles 30 that are coextruded together with the plastic of the core 6 and of the cladding is used.

Figure 4:
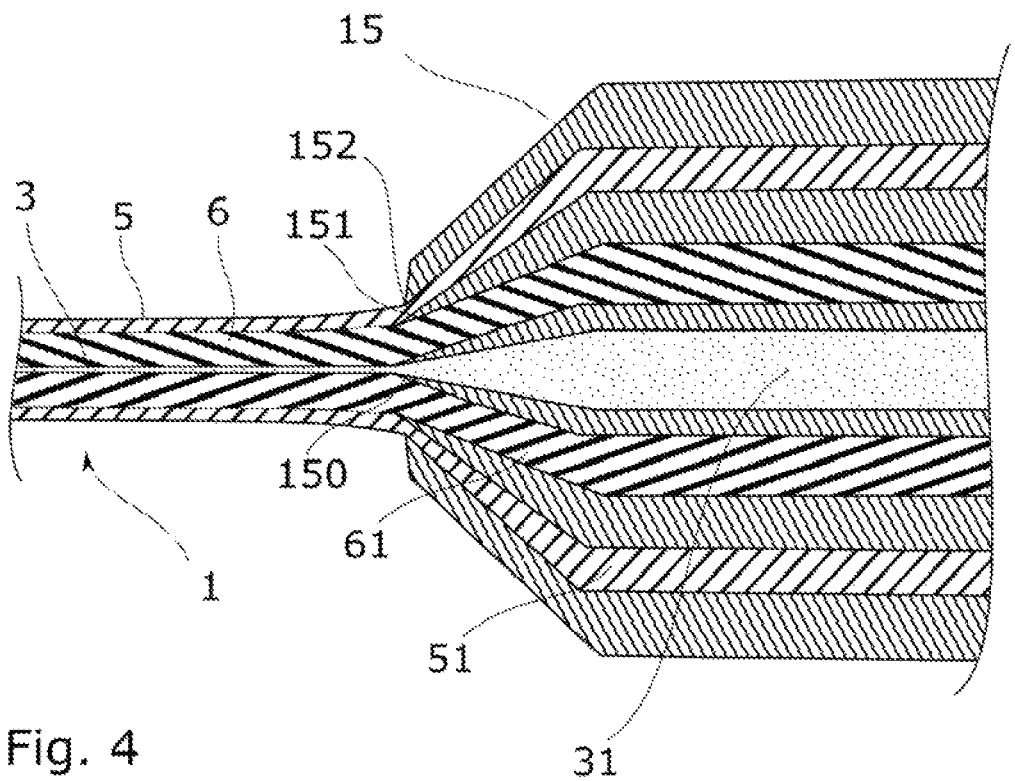
FIG. 4 shows an extrusion nozzle for the production of the light guide.

In particular, however, three plastics can be coextruded, whereby the innermost plastic, contains light-scattering particles, for example, in order to form the light-scattering soul 3. To this end, FIG. 4 shows a corresponding extrusion nozzle 15 for the simultaneous extrusion of the soul 3, the core 6, and the cladding 5. The extrusion nozzle 15 has a central nozzle 150, through which the plastic 31 is extruded for formation of the soul 3. As in the case of the example of FIG. 3, this plastic can contain light-scattering particles. Situated around the central nozzle 150 are two concentrically arranged ring nozzles 151, 152, through which the plastics of the core 6 and the cladding 5 are extruded, so that the light guide 1 together with the light-scattering soul 3, the core 6, and the cladding 5 can be produced in one extrusion step.

Coming into consideration as light-scattering particles 30 in the soul are, in general, among other materials, the following materials: oxides, such as titanium dioxide, zirconium oxide, and talcum (MgO), as well as chalk, Tospearl beads, glass beads (hollow beads), and white glass rods.

Alternatively, it is also possible to use for the light-scattering soul a polymer that contains no light-scattering particles, but rather, owing to its molecular properties, such as, for example, phase separations or demixings, itself manifests a light-scattering effect, which results in a corresponding scattering length, such as, for example, a PTFE. Also possible as a light-scattering soul is a polymer mixture, whereby the polymer mixture produces the corresponding scattering length of the light, for example, by crystallization at the interfaces of the different polymers or by way of different indices of refraction of the mixed polymers.

In a preferred embodiment, it is also possible to use a combination of a polymer mixture or of a self-scattering polymer and added scattering particles in order to be able to adjust specifically the scattering effect of the soul in a range of 5% to 100% of the impinging light. Thus, it is also possible to adjust a wavelength-dependent scattering in sections in the light guide, which can be exploited either for a homogenization of the color location of the emitted light or for the creation of effect regions.

When scattering particles and/or bubbles and/or other locally defined scattering centers are used, their mean cross-sectional dimension, in particular measured in the cross section perpendicular to the longitudinal axis, is smaller in the case of round geometries with a mean diameter (defined as the D50 value, that is, 50% of the scattering particles present are smaller than the given value) chosen in the range of less than 50 µm, preferably less than 10 µm, especially preferred less than 1 for, at the same time, a concentration thereof that is so high that a scattering length in the range of two times the cross-sectional dimension of the soul 3 or less results. Concentrations of more than 10 scattering particles and/or bubbles and/or other locally defined scattering centers per cubic millimeter in the soul 3 are thereby advantageous.

The ratios of the diameters or areas of soul 3, core 6 and cladding 5 can deviate strongly from the illustrations of FIG. 2 and FIG. 3, which are only given by way of example. In particular, the cladding 5 can have a smaller layer thickness in relation to the core 6. Owing to the thick core 6 in relation to the soul 3 and the cladding 5, it is possible for much light to be coupled into the light guide 1. This is especially advantageous in the case of a plastic light guide, for which the differences in the indices of refraction of cladding and core or the numerical aperture is or are not very great. In general, to this end, in a further development of the light guide 1, it is provided that the ratio of the cross-sectional area of the light guide 1 enclosed by the contour of the cladding to the cross-sectional area of the cross-sectional area enclosed by the contour of the core 6 lies in the range of 1.01 to 2, preferably in the range of 1.1 to 1.6. Furthermore, it is generally preferred that the layer thickness of the cladding 5 is at least 3 µm. This is appropriate, among other things, in order to achieve a reliable embedding of the core 6 during coextrusion.

In the case of a round light guide 1, as illustrated in FIG. 2 and FIG. 3, the mentioned cross-sectional areas are the circular areas with the diameters of cladding 5 and core 6. In accordance with an example, the light guide 1 has a diameter of 2 millimeters. The cladding 5 has a wall thickness of 0.2 millimeters. Therefore, for the cross-sectional area enclosed by the contour of the cladding 5, this results in $A_{cladding} = \pi \cdot (2 \text{ mm}/2)^2 = 3.14 \text{ mm}^2$ and, for the cross-sectional area enclosed by the contour of the core 6, this results in $A_{core} = \pi \cdot (1.6 \text{ mm}/2)^2 = 2.01 \text{ mm}^2$. The ratio of the cross-sectional areas is thus 1.56.

In order to achieve a high luminance, which, for example, affords a light emission that is visible to the eye even in bright daylight surroundings, it is further favorable to provide a thin soul 3. In general, in a further development, the soul 3 accordingly has a diameter in the range of 10 micrometers to 1000 micrometers. Preferably, the diameter lies in the range of 100 µm to 800 µm. The soul 3 need not necessarily have a circular cross section. However, the size of the soul 3 can generally be given also by its cross-sectional area. In this case, the soul 3 has a cross-sectional area in the range of 80 µm² to 0.8 mm².

The design of the light guide 1 with a light-scattering soul 3 makes it possible to simply adjust the desired properties in terms of lighting technology. Favorable properties with high luminance are obtained, in particular, when the diameter of the soul 3 lies in the range of 1/60 to 1/2, preferably in the range of 1/20 to 1/2, of the diameter of the core 6. If the ratios of the areas are regarded more generally, then, in accordance with this embodiment, the ratio of the cross-sectional areas of the soul 3, $Q_{soul}$, and the core, $Q_{core}$, that is, the ratio ($Q_{soul}/Q_{core}$), lies in the range of $2.5 \cdot 10^{-3}$ to 0.25.

In particular, however, the light scattering can also be adjusted by the ratio of the cross-sectional areas of core 6 and soul 3 in relation to the length of the light guide. The larger is the core 6 in relation to the soul 3, the smaller is the light scattering per unit length.

For this purpose, the quotient of the ratio of the cross-sectional areas of core ($Q_{core}$) and soul ($Q_{soul}$) to the length of the light guide ($L_{light\ guide}$) can be considered, that is, the term ($Q_{core}/Q_{soul}$)/$L_{light\ guide}$. Favorable optical properties are obtained for values in the range of 20 m$^{-1}$ to 500 m$^{-1}$.

Typically, a side-emitting light guide differs from light guides for data transmission in having a shorter provided length, because, with increasing length for a given brightness of the coupled light emitter, the luminance declines. To this end, without any limitation to specific embodiments, it is provided in a further development of the invention that the light guide 1 has a length in the range of 0.5 meter to 100 meters, preferably to 50 meters. Long lengths are suitable, in particular, in connection with lasers as light emitters. For decorative lighting and other applications of lighting technology, shorter lengths up to 105 meters, preferably 2.5 to 5 meters, are especially suitable. In the field of medicine, as, among other things, components for single or multiple use, in devices for diagnostic and therapeutic treatments, lengths of less than 0.5 meter, preferably less than 0.1 meter, particularly preferred 0.01 to 0.05 meter, are suitable in this case for a preferred diameter of the light guide 1 of approximately 1 mm and thinner.

It has been found that the problem of a detachment of the cladding 5 from the core 6 can be circumvented especially effectively by having the plastics of cladding 5 and core 6 comprise a polymer blend or a mixture of at least two polymers. It has also been shown that a mixture of polymers is possible for an adequately transparent element for the light guide 1, and any demixing of the phases relevant to scattering does not occur or at least is not critical. The latter point is relevant, in particular, in relation to side-emitting light guides. Even when a demixing occurs, any minor light scattering associated therewith is not very detrimental in this case as long as the light scattering at the soul dominates. In contrast to light guides for signal transmission, for example, a light scattering in this case does not lead to any substantial limitation of the functionality. This is also associated with the relatively short length of the light guide for the applications provided here, because light does not need to be guided over long path distances with low loss.

A polymer blend enables the properties of an adequate transparency and a high flexibility to be combined. As a component or as one of the polymers of the polymer blend, it is preferably possible to utilize an aliphatic polyurethane, which is especially elastic and can be combined with other plastics to form a highly transparent polymer blend. In particular, such an aliphatic polyurethane can also be a thermoplastic elastomer. Alternatively or additionally, it is also possible for another thermoplastic elastomer to be a component of the polymer blend. Correspondingly, in accordance with another embodiment, it is provided that at least one of the polymers of the polymer blend forms a thermoplastic elastomer.

In the case of another embodiment, one of the polymers of the polymer blend is a polycarbonate. Polycarbonates are advantageous in terms of the transparency of the cladding. The same holds true for PMMA. In accordance with yet another alternative or additional embodiment, therefore, it is provided that one of the polymers of the polymer blend is a polymethyl methacrylate.

An especially suitable combination is a polymer blend that, in general, contains polymethyl methacrylate and a thermoplastic polyurethane. These two components alone can form, in particular, the polymer blend or, when further components are present, can be the two components with the two largest proportions in the mixture of the blend.

PMMA and thermoplastic polyurethane can be combined well in various mixture ratios in order to produce mixtures with adequately different indices of refraction for core and cladding. Preferred is a ratio of PMMA to TPU in the range from 90 weight percent to 10 weight percent to 10 weight percent to 90 weight percent. In some embodiments, the ratio of PMMA to TPU is 25 parts PMMA to 30 parts TPU. In other embodiments, the ratio of PMMA to TPU is 60 parts PMMA to 40 parts TPU.

Additional polymers that are utilized for suitable, adequately transparent polymer blends, in particular as a further component, in addition to two components with the two highest proportions, are polymers of the polyether, polystyrene, polyacrylonitrile, polyester, polyvinyl chloride type. It is also possible to utilize as components copolymers that are formed from the polymers mentioned here.

In accordance with yet another additional, especially preferred further development of the embodiment with polymer blends as plastics, it is provided that the plastics of both core 6 as well as the cladding 5 are polymer blends with at least two compatible polymer components, whereby the proportions of the polymer components are differently weighted, so that the index of refraction of the cladding 5 is lower than the index of refraction of the core 6.

Figure 5:
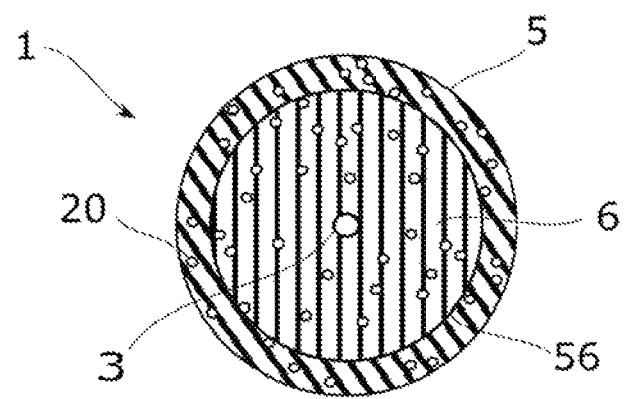
FIG. 5 shows a variant of a light guide with particle-containing plastics.

In accordance with yet another further development, it is provided that at least one of the plastics of core 6 and cladding 5 contains polymer particles. These particles can further improve the mechanical properties. Thus, polymer particles as an additive for increasing the impact strength are known. FIG. 5 shows, in a cross-sectional view, a variant of the embodiment of FIG. 2. In this variant, polymer particles 20 are embedded both in the plastic of the cladding 5 and in the plastic of the core 6. In general, without any limitation to the special example, it is provided that at least one of the plastics of cladding 5 and core 6 contains embedded polymer particles.

A very transparent and, at the same time, impact-resistant and abrasion-resistant plastic, which is thereby capable of resisting scratches, can be obtained in accordance with an advantageous further development when at least one of the plastics of cladding 5 and core 6 contains polymer particles 20 with cross-linked PMMA. This embodiment is then suitable especially in combination with a polymer blend that contains PMMA. In accordance with yet a further development of the invention, therefore, a polymer blend is provided, which contains PMMA as a component and additionally contains polymer particles with cross-linked PMMA. Especially preferred plastics that are used both for the core 6 and the cladding 5 and, in particular for both elements, are polymer blends with PMMA and aliphatic or thermoplastic polyurethane as well as the mentioned particles 20 with cross-linked PMMA.

In one embodiment, in contrast to what is illustrated in FIG. 5, particles 20 are embedded only in the cladding. Thus, the core can be formed from pure PMMA or TPU and the cladding from a polymer blend. With this embodiment, it is possible to achieve an especially high transparency of the core 6.

It is also possible with the structure of a light guide 1 described herein, to utilize, alternatively or additionally to impact-strength modifiers, further additive substances that otherwise tend to be rather detrimental to the optical properties. In particular, it is thought to utilize in the cladding 5 at least one additive substance that can be a flame retardant or a UV stabilizer. The optical properties of the light guide 1 are hardly influenced by these additive substances in the cladding 5, because the transmission of the core 6 is not disrupted, and after a scattering at the soul 3, the light traverses only a short path distance through the cladding 5.

In general, the light guide 1 described here is characterized by a high resistance toward any change in the optical properties after a bending of the light guide. This is because, owing to the plastics used, a connection is created between core and cladding and, during or after a bending of the light guide, this connection is generally not loosened. In particular, in accordance with one embodiment, it holds true that the additional light loss caused by the bending of the light guide 1 for a bending radius of the light guide 1 of 21 mm is less than 0.1 times the total luminous intensity carried per winding of the light guide 1. Furthermore, the additional light losses caused by a bending of the light guide 1 for a bending radius of the light guide 1 of 12 mm is less than 0.3 times the total luminous intensity carried in the light guide per winding of the light guide 1. These properties apply, in particular, to light guides 1 with an outer diameter or a diameter of the cladding of 10 mm or less, thus in particular to light guides with a diameter in the range of 1 to 10 millimeters. The positive property that little additional light is out-coupled or decoupled during bending is greater, the larger is the outer diameter of the light guide. The additional light losses, that is, the light losses in addition to the light losses caused by emission due to scattering at the soul 3, can otherwise be seen or are further present as sections, possibly also after a bending stress, that is, irreversibly. Accordingly, the light emission then appears non-uniformly along the light guide with one brightly shining region or a plurality of brightly shining regions.

Figure 6:
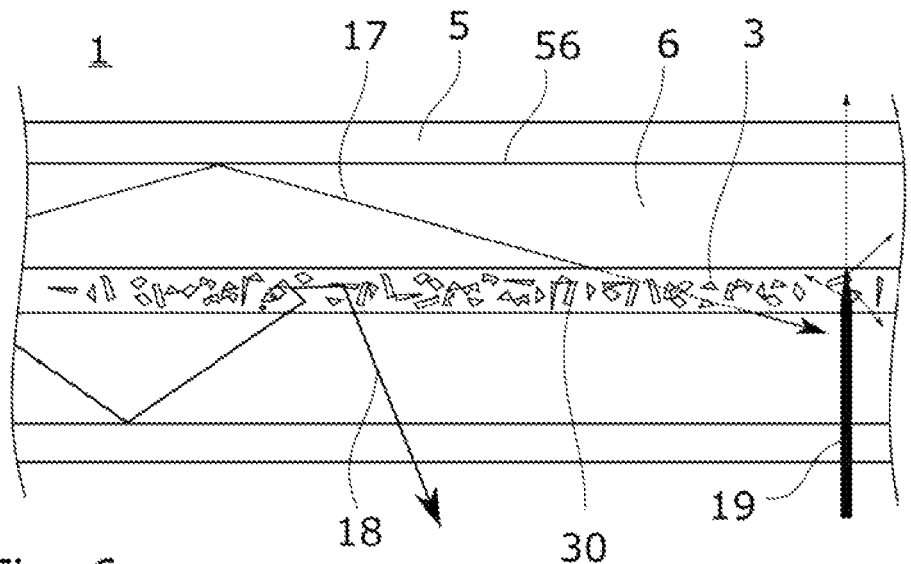
FIG. 6 shows a beam path in the light guide.

FIG. 6 schematically shows a light guide 1 in side view with, by way of example, beam paths of two beams of light 17, 18. The soul 3 of this example comprises as light-scattering elements both particles 30 and bubbles 32. Such bubbles 32 can be produced specifically during fabrication of the light guide 1 by means of extrusion, in particular by means of coextrusion, by way of a physical or chemical foaming.

Both beams of light 17, 18 are totally reflected at the interface 56 between cladding 5 and core 6 and are thereby guided into the core 6. After reflectance at the interface 56, the beam of light 17 laterally bypasses the soul 3 and thus is not scattered. In contrast to this, the beam of light 18 impinges on the soul 3 and undergoes a scattering at the light-scattering particles in the plastic of the soul 3. The change in the direction of the light beam 18 caused by the scattering is such that the angle at which the beam of light impinges on the interface 56 exceeds the critical angle of the total reflectance, so that the beam of light passes the interface 56 and the cladding 5 and exits toward the outside.

As illustrated, in this case, the beam of light 18 is in fact multiply scattered—in the example, three times. The mean number of the scatterings results, above all, from the density of the scattering elements, that is, particles 30 and/or bubbles 32, in the soul 3. A multiple scattering has proven to be favorable for the angular distribution of the light emitted from the light guide 1. For a single scattering, there results a preferred direction along the light guide in the direction of the light guide, that is, in the direction from left to right in the example illustrated. The light guide 1 thereby appears different in brightness depending on the direction in which it is viewed. This effect can be attenuated or even abolished by multiple scatterings, so that the light emission is essentially isotropic. In accordance with a preferred embodiment, therefore, it is generally provided that the light-scattering particles 30 have a density in the soul 3 that is so high that the beams of light of the light guided in the core 6 that impinge on the soul 3 are scattered more than one time on average. This mean value can also be smaller than the value 2.

The beam of light 19 originates from a light emitter 4 that is not coupled to the core 6, but rather it impinges laterally on the light guide 1, traverses the cladding 5 and the core 6, and is attenuated in the soul 3 by scattering. The luminous intensity is symbolized by the line thickness, the scattering by the branching thin arrow. The soul is either completely opaque or at least, as in the illustrated example, so strongly scattering that the scattering length is at most twice as long as the greatest cross-sectional dimension, in particular the diameter of the soul 3. In the illustrated example, a small fraction of the original luminous intensity still completely traverses the soul 3. However, this fraction is so small in general that the soul 3 appears opaque as viewed from the side.

In general, the soul 3 can exhibit a varying nature along the radial direction of the cross section, that is, from the inside toward the outside. This can also comprise, in particular, a multilayer structure of the soul 3. In the illustrated example, the concentrations of particles 30 and bubbles 32 differ in the radial direction. In particular, the particles 30 are rather concentrated in the middle of the soul 3, whereas the bubbles tend to be present in the periphery of the soul. Even when, in this case, no sharp interface is present, this represents a multilayer structure in which an inner part with high particle concentration is surrounded by a shell with a high bubble concentration. In the already explained embodiment with a wire or a cord as a component part of the soul 3, the latter can be surrounded by a scattering, in particular opaque, plastic layer, so that a multilayer soul 3 exists.

The light guide 1, such as that described here, is suitable especially as contour or accent lighting or, more generally, as decorative lighting. As a design element of this kind, the light guide can be utilized for such an lighting in interior spaces of buildings as well as for their furnishings, such as, for example, in or at furniture or at or in instruments and machines as well as in the outside region of buildings, such as, for instance, on facades, as well as for the interior and exterior illumination of vehicles. Vehicles can be wheeled vehicles or railed vehicles, ships, and aircraft.

In particular, in the case of vehicles, such as automobiles, aircraft, ships, and/or trains, the light guide can be used as a part of the inner trim of vehicles. In the field of interior decoration, the light guide can be utilized as a part of furniture and, in particular, of vehicle seats, interior designs, and/or kitchens. Further applications are use as a component part of a spotlight (40), in particular a vehicle headlight, the illumination of landing strips for aircraft, use, together with other light guides and/or other side-emitting step index fibers, for the formation of a fabric structure, which, on its part, can form an illuminating body, the background lighting of displays, use as ambient or side-marker lights in vehicles, ships, aircraft, buildings, streets, way markers, street signs, textiles, use as safety lighting using self-luminescent phosphorescent additives.

A further application is use in or on medical technology devices, such as, for example, as accent or contour or safety lighting. It is further also provided to use the light guide 1 or the light source 2 as a device or at least as a component of a device for a medical therapy procedure, in particular for a photodynamic therapy (PDT) for use in tumor therapy, for an endovenous laser therapy (EVLT) for the treatment of varicose veins, for a laser-induced interstitial thermotherapy (LITT), or for applications in the fields of ophthalmology, dentistry, and dermatology, particularly in the latter instance, that is, for promoting the healing of wounds. In terms of use in the general field of medical technology, it is further advantageous when the plastic used and the plastics used, that is, also the polymer blends, preferably comprise biocompatible plastic materials, which, for example, are listed in accordance with the standard EN ISO 10993-1:2018 or EN ISO 10993-5:2009 or USP Class VI. In addition, the material that is utilized should be chosen in such a way that it can be sterilized, in particular by using ethylene oxide (EO), because this sterilization method is of interest, in particular, in single-use applications (disposable applications) in the area of medical technology, such as described in ISO 11135:2014. Attention should be paid here, in particular, to the absence of chlorine in the material, because, during the EO process, chlorine-containing compounds can otherwise form and, on the one hand, can be toxic and, on the other hand, can only be completely eliminated after the sterilization process.

One use of the light guide according to the invention is especially advantageous, due to its insensitivity to bending, for utilization in photobioreactors or any other kind of photobiological processes. In this case, the light guide can be put in place both from the outside onto (transparent) reactors or, regardless of the transparency of the reactor wall, in the interior of such reactors, because the light guides are opaque to liquids and are stable against chemicals.

Figure 7:
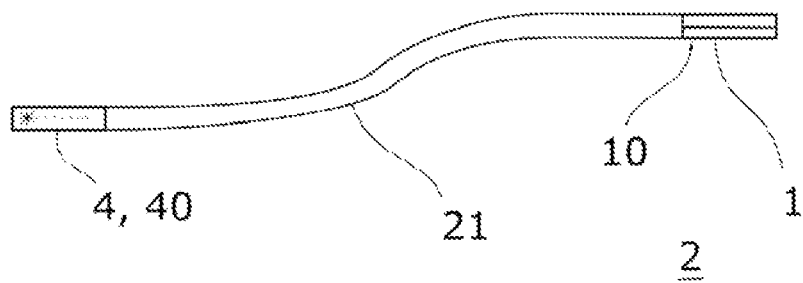
FIG. 7 shows an embodiment of a light source in which the light is in-coupled via an additional light guide.

One embodiment of a light source 2 that, among other things, is also especially suitable for medical applications is shown in FIG. 7. In this embodiment, the light of the light emitter 4 is coupled into an additional light guide 21, which is optically connected to one end 10 of the side-emitting light guide 1. This embodiment is then especially appropriate when the additional light guide 21 is also flexible in design. Preferably, a short section for the side-emitting light guide is used in this case. Thus, in a further development of this embodiment, it is conceived to use a light guide with a length in the range of 5 mm to 50 mm. The light guide 1 serves here as a diffuser for the light conveyed into the additional light guide 21. For medical applications, the diffuser can be brought to an intended position at or in the body of a patient being treated and the light can be emitted there via the light guide 1. For optical coupling to the light guide 1, the additional light guide 21 can be fused to or adhesively attached to the light guide 1. For high luminous intensities, the use of a laser 40 is generally offered here as a light emitter 4.

Without any limitation to the special illustrated example, a light source 2 is provided in which the side-emitting light guide 1 is joined to an additional flexible light guide 21 and whereby a light emitter 4, preferably a laser 40, is coupled to the additional flexible light guide 21, so that, via the additional light guide 21, the light of the light emitter 4 is coupled into the side-emitting light guide 1 and is emitted along the side-emitting light guide 1. This light source 2 can be utilized, in particular, for the above-mentioned medical applications.

The basic function of the side-emitting light guide 1 is effected by the light scattering in or at the soul 3. Besides the scattering property, however, the light guide 1 can also have, quite generally, filtering properties or the spectrum of the emitted light can change in comparison to the spectrum of the in-coupled light. In this way, it is possible to achieve a large number of light effects. In accordance with one embodiment, the soul 3 contains pigments or other colored scattering particles. These scattering particles absorb portions of the light depending on the wavelength, so that the reflected or scattered light also differs spectrally from the light guided in the core and is given a coloration. In accordance with another alternative or additional embodiment, at least one of the plastics of core 6 and cladding 5 is colored. In general, the coloring agent does not increase the scattering, so that the plastic remains transparent. The coloring agent in accordance with this embodiment is therefore accordingly not a pigment. Through the partial spectral absorption of the coloring agent, the spectral distribution of the light that passes through the plastic is altered. If need be, the coloring agent is provided by the polymer used or by a polymer component itself, which is distinct from the alternative of having coloring agent molecules dissolved in the polymer matrix.

Yet another possibility for spectrally influencing the light is the conversion to other wavelengths, that is, the conversion of light of one wavelength to light of at least one other wavelength by use of a suitable conversion material. This is advantageous in order to lose little intensity in the case of a spectral change in the emitted light. Such a conversion is achieved, in particular, in that the light guide 1 contains a photoluminescent material. The photoluminescence can be both a fluorescence and a phosphorescence. The photoluminescent material can be contained in one component or in a plurality of components of the light guide 1 and come into contact with the light, in particular in soul 3 and in cladding 5. For example, the soul 3 can contain photoluminescent particles 30. Thus, it is possible, for example, for blue light to be fed in and scattered at the soul 3 and partially converted to yellow light, for example, each time depending on the properties of the particles, in order for white light to be emitted by the mixture of these components. For example, however, it is also possible for a photoluminescent material to be contained in the cladding in order to convert at least a part of the luminous intensity during passage of the light that is scattered at the soul. In this case, the different optical effects that can be achieved are clearly evident. For a colored cladding 5, the color impression of the brightly shining soul 3 is changed for the observer. In the case of a photoluminescent coloring agent in the cladding 5, a light glow is created around the brightly shining soul 3, whereby this light glow has a color that is different from the light emitted directly from the soul. When phosphorescing additives are used, it is possible to produce an afterglow effect of the light guide, even when the light source of the light guide is switched off. It is thereby possible to create a safety lighting for use in hospitals, vehicles, ships, or the aircraft field, for example. Moreover, the phosphorescing particles in the light guide are also excited by external light, so that such a light guide can also be utilized as passive safety lighting or as passive accent lighting.

Figure 8:
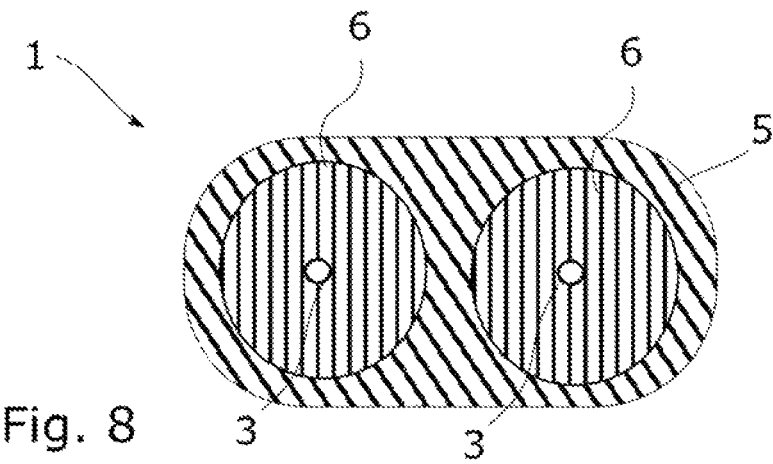
FIG. 8 and FIG. 9 show embodiments with a plurality of cores.

FIG. 8 shows an example of an embodiment of the light guide 1 in which a plurality of cores 6 are surrounded by a common cladding 5. In each case, at least one soul 3 extends along the cores 6 for light emission. In the exemplary embodiment of FIG. 8, two cores 6 are provided, but it is also possible to combine still more cores 6 in a cladding 5.

Such an embodiment can also be designed for achieving special light effects. Thus, it is possible to couple light of different colors into the cores 6.

Furthermore, conductors or elements with another function can be integrated in the cladding.

Figure 9:
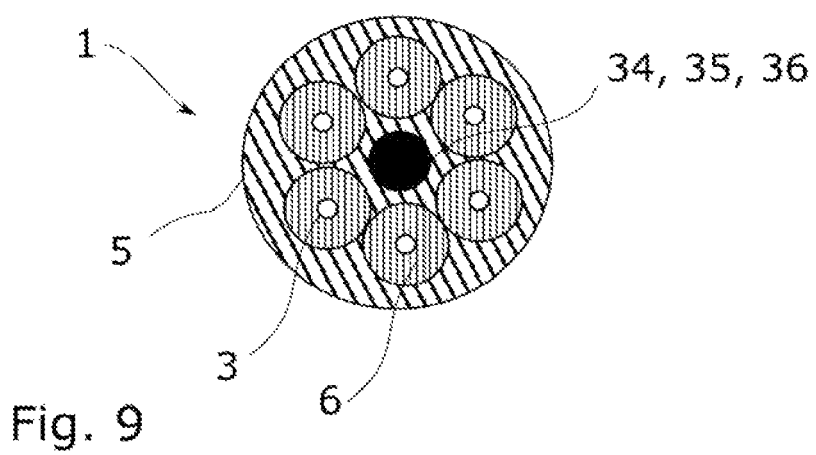

FIG. 9 shows a further example of the embodiment with a plurality of cores 6, which are surrounded by a common cladding 5. In this case, there are, as illustrated, six circular cores 6 distributed in the cladding 5. They can also extend, for example, in a stranded or twisted manner, such as is possible, in general, when a plurality of cores is present.

In accordance with yet another embodiment, which is likewise realized in the illustrated example, it is provided that, in addition to at least one core 6 in the cladding 5, a functional element 34 that extends in the longitudinal direction of the light guide 1 is arranged. Such a functional element 34 can be, in particular, an electrical conductor 35 or a reinforcement element 36. Coming into consideration as a reinforcement element 36 is a metal or plastic wire or cord. An electrical conductor 35 can also have, at the same time, the function of a stability-enhancing reinforcement element 36.

The functional element can also have an optical function. In the example shown in FIG. 10, the functional element 34 is an elongated reflectance element 37 for reflectance of light that is emitted at the soul 3. Preferably, as illustrated, the reflectance element 37 is flat and thus strip-shaped.

Figure 10:
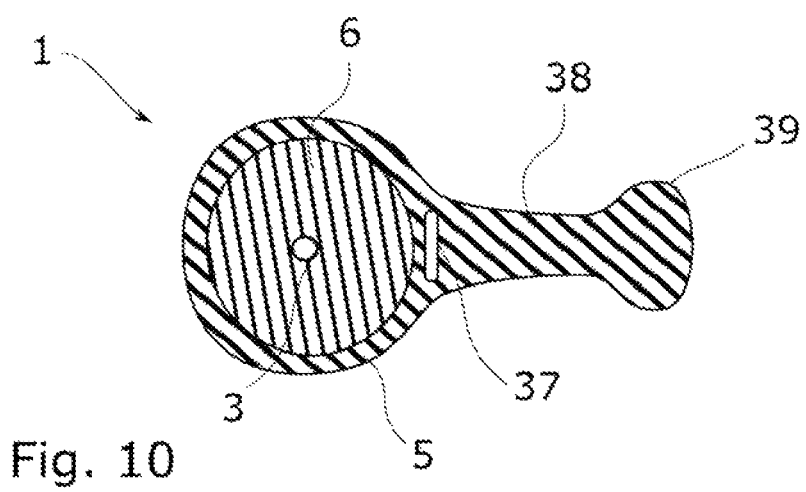
FIG. 10 is an exemplary embodiment with various additional functional elements.

In accordance with yet another embodiment, which is likewise realized in the illustrated example of FIG. 10, the cladding has an elongated fastening element 38 in order to fasten the light guide 1 in a form-fitting manner to a corresponding holding element, such as, for instance, a groove or a rail on an object that is furnished with the light guide 1. In the illustrated example, the fastening element 38 is designed as a rib with a thickened end piece 39. The rib can then be inserted in a corresponding groove, whereby the thickened end piece 39 brings about a locking in place.

All of the mentioned variants can also be integrated or employed only in sections in the light guide, while other sections do not have these functionalities. It is thereby possible to achieve a plurality of effects. It is also possible for sections to have no laterally light-emitting properties, so that the light can be transported to more remote points with little loss.

In general, electromagnetic radiation sources or emitters for the light guide can be utilized in a wavelength range of 150 nm to 15 µm, depending on the materials used for the light guide and the desired application. Any kind of laser sources, LEDs, arc lamps, filament lamps, or any other kind of suitable radiation sources are conceivable here.

LIST OF REFERENCE NUMBERS

1 light guide
2 light source
3 Soul
4 light emitter
5 Cladding
6 Core
10, 11 end of 1
12 Bend
15 extrusion nozzle
17, 18, 19 beams of light
20 polymer particles
21 additional light guide
30 Particles
31 plastic of the soul 3
32 bubble
34 functional element
35 electrical conductor
36 reinforcement element
37 reflectance element
38 fastening element
39 thickened end piece
40 Laser
51 plastic of the cladding 5
61 plastic of the core 6
56 interface between 5, 6
150 central nozzle
151, 152 ring nozzle

What is claimed is:

1. A side-emitting light guide, comprising
a core;
a soul extending in the core along a longitudinal axis; and
a transparent cladding surrounding the core,
wherein the core and the transparent cladding are formed from transparent plastic with the core having a higher index of refraction than the transparent cladding,
wherein the soul is light-deflecting and scatters light that guided in the light guide to emit the light through the transparent cladding toward an outside,
wherein the soul has a scattering length that is at most twice as large as a maximum cross-sectional dimension of the soul,
wherein the cross section is measured perpendicular to the longitudinal axis, and
wherein the scattering length is defined as a length for which, owing to scattering, an original intensity of the light in an incident direction has declined by a factor of 1/e.

2. The side-emitting light guide of claim 1, wherein the soul has a cross-sectional area that is smaller by at least a factor of 4 than a cross-sectional area enclosed by an outer contour of the transparent cladding.

3. The side-emitting light guide of claim 1, wherein the soul has a feature selected from a group consisting of: the soul comprises a cord; the soul comprises a wire; the soul has a diameter of 10 µm to 1000 µm; the soul has a cross-sectional area of 80 µm$^2$ to 0.8 mm$^2$; the soul varies in a radial direction of the cross section; the soul has a multilayer structure; the soul has an electrical conductor; the soul is an electrical conductor; and any combinations thereof.

4. The side-emitting light guide of claim 1, wherein the core and the transparent cladding comprise a polymer blend.

5. The side-emitting light guide of claim 1, wherein the core and the transparent cladding each comprise a polymer blend with at least two compatible polymer components, wherein the at least two compatible polymer components are differently weighted in the core and the transparent cladding so that the index of refraction of the transparent cladding is lower than the index of refraction of the core.

6. The side-emitting light guide of claim 1, wherein the light guide has a length of 0.5 meter to 100 meters.

7. The side-emitting light guide of claim 1, further comprising a ratio ($Q_{core}/Q_{soul}$) of a cross-sectional area of the soul ($Q_{soul}$) to a cross-sectional area of the core ($Q_{core}$) that is in a range of $2.5 \cdot 10^{-3}$ to 0.25.

8. The side-emitting light guide of claim 1, further comprising a ratio of a diameter of the soul to a diameter of the core in a range of 1/20 to 1/2.

9. The side-emitting light guide of claim 1, further comprising a ratio (($Q_{core}/Q_{soul}$)/$L_{light\ guide}$) of a quotient of a cross-sectional area of the soul ($Q_{soul}$) and a cross-sectional area of the core ($Q_{core}$) to the length of the light guide ($L_{light\ guide}$) that has a value in a range of 20 m$^{-1}$ to 500 m$^{-1}$.

10. The side-emitting light guide of claim 1, further comprising:
light losses caused by bending the light guide with a bending radius of 21 mm are less than 0.1 times a total luminous intensity guided in the light guide per winding of the light guide; and/or light losses caused by bending the light guide with a bending radius of 12 mm are less than 0.3 times a total luminous intensity guided in the light guide per winding of the light guide.

11. The side-emitting light guide of claim 1, wherein the soul comprises light-scattering elements in a concentration that is greater than 10 particles per cubic millimeter of the soul.

12. The side-emitting light guide of claim 1, wherein the soul comprises light-scattering elements in a concentration that sufficient so that light impinging on the soul are scattered more than one time on average.

13. The side-emitting light guide of claim 1, where the light guide comprises a feature to alter a spectrum of emitted light in comparison to a spectrum of coupled-in light, wherein the feature is selected from a group consisting of: pigments or colored scattering particles in the soul; coloring of plastics of the core; coloring of plastics of the transparent cladding; photoluminescent material in the light guide.

14. The side-emitting light guide of claim 1, wherein the transparent cladding surrounds a plurality of the core.

15. The side-emitting light guide of claim 1, further comprising a functional element extending in a longitudinal direction of the light guide, the transparent cladding surrounding the functional element.

16. A light source, comprising:
the side-emitting light guide of claim 1; and
a light emitter optically coupled to one end of the side-emitting light guide.

17. The side-emitting light guide of claim 2, wherein the cross-sectional area enclosed by the outer contour of the transparent cladding is at least 0.7 $mm^2$.

18. The side-emitting light guide of claim 4, wherein the polymer blend comprises a component selected from a group consisting of aliphatic polyurethane, thermoplastic elastomer, polymethyl methacrylate, polycarbonate, embedded polymer particles, and any combinations thereof.

19. The side-emitting light guide of claim 4, wherein the polymer blend of the transparent cladding further comprises an additive selected from a group consisting of a UV stabilizer, a flame retardant, an impact-strength modifier, and any combinations thereof.

20. The side-emitting light guide of claim 4, wherein the polymer blend comprises polymethyl methacrylate and thermoplastic polyurethane.

21. The side-emitting light guide of claim 4, wherein the polymer blend comprises particles with cross-linked PMMA.

22. The side-emitting light guide of claim 15, wherein the functional element is selected from a group consisting of an electrical conductor, a reinforcement element, and combinations thereof.

* * * * *